May 1, 1923.
J. HADKA
1,453,624
CONTROLLING DEVICE FOR MUFFLER CUT-OUTS
Filed Nov. 5, 1920
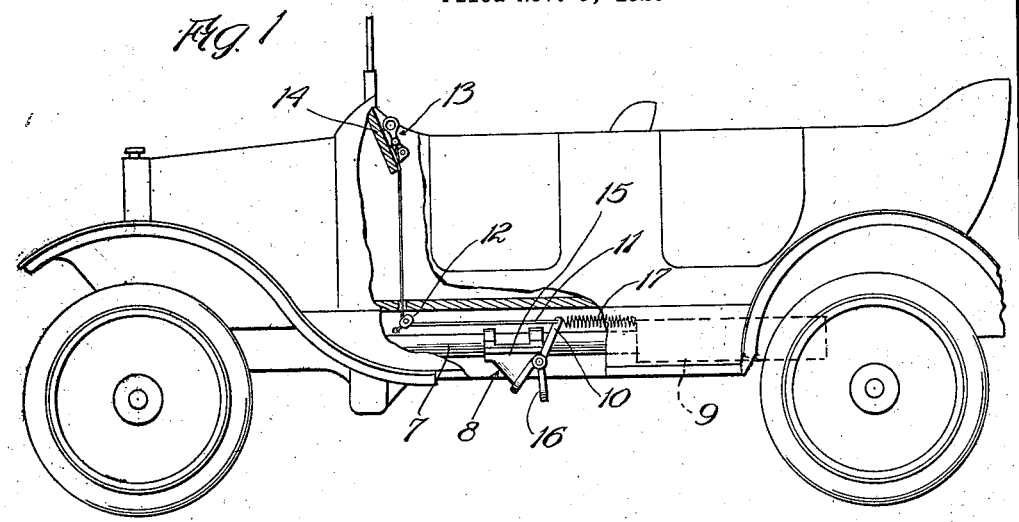
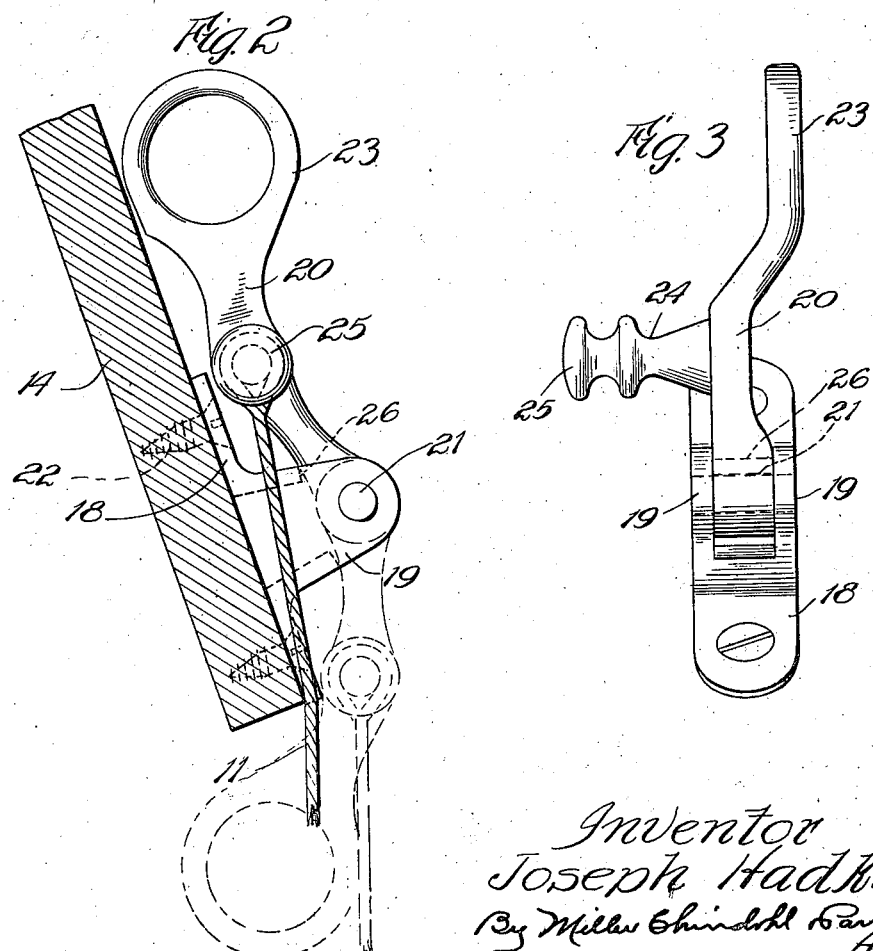
Inventor
Joseph Hadka Patented May 1, 1923.

1,453,624

UNITED STATES PATENT OFFICE.

JOSEPH HADKA, OF OAK PARK, ILLINOIS.

CONTROLLING DEVICE FOR MUFFLER CUT-OUTS.

Application filed November 5, 1920. Serial No. 421,930.

*To all whom it may concern:*

Be it known that I, JOSEPH HADKA, a citizen of the United States, residing at Oak Park, in the county of Cook and State of Illinois, have invented certain new and useful Improvements in Controlling Devices for Muffler Cut-Outs, of which the following is a specification.

The invention relates in general to muffler cut-outs for motor vehicles, and has particular reference to an improved controlling device therefor.

The primary object of the invention is to provide a cut-out controlling device of an extremely simple construction, which is operable with the utmost ease to open and close the cut-out valve and to maintain it in open position against the action of a spring or other means tending to close the valve.

The object of the invention thus generally stated, is attained by the construction and arrangement illustrated in the accompanying drawings forming part hereof in which Figure 1 is a fragmentary side elevation of a motor vehicle having my improved controlling device applied thereto, the cut-out and associated parts being shown slightly exaggerated in size for the sake of clearness. Fig. 2 is a fragmentary vertical sectional view through the dash of the vehicle, showing the controlling device on an enlarged scale. Fig. 3 is a front elevation of the controlling device detached.

Referring to Fig. 1, I have shown by way of illustration a motor vehicle having an exhaust pipe 7 provided with a cut-out 8 for a muffler 9. The cut-out comprises an operating lever 10 connected by means of a flexible connection or cable 11 passing over a guide pulley 12 with a controlling device 13. Preferably the latter is mounted upon the dash 14 of the vehicle.

The cut-out 8 may be of any suitable or preferred construction. Herein it comprises a casing 15 clamped upon the exhaust pipe 7 and communicating therewith through a suitable aperture (not shown) provided in the exhaust pipe. Said casing has an outlet opening controlled by a valve member 16 rigid with the operating lever 10. A coiled tension spring 17 extending between the free end of the lever 10 and a stationary part such as the muffler 9, serves normally to close the valve 16.

The controlling device 13 comprises a pivotal support 18 which is preferably cast to provide a pair of ears 19 spaced apart to receive between them the end of a hand lever 20 which is mounted upon a pivot pin 21 entered through the ears 19. The support 18 is secured to the dash or other convenient part of the vehicle as by means of screws 22.

The hand lever 20 may be shaped at its free end to provide a finger ring 23, and substantially midway between its ends has a laterally projecting member 24 having a grooved head 25 located to one side of the pivotal support 19. To this head 25 the flexible cable 11 is attached, the opposite end of the cable being secured to the lever 10 as above set forth.

By thus locating the point of attachment of the cable 11 with the controlling device to one side of the pivotal support 19, the hand lever 20 is capable of being swung from a lower or suspended position upwardly and thence forwardly and downwardly beyond dead center without restriction or interference by the pivotal support with the cable in its movement with the hand lever (Fig. 2). The parts are so arranged that in such swinging movement of the hand lever the operating lever 10 is swung against the action of the spring 17, and after the hand lever passes dead center, it is caused by the spring to assume a holding position in which the valve member 16 is held open.

Suitable means are provided for thus limiting the forward and downward movement of the hand lever 20 to define such holding position. Herein said means comprises a part of the pivotal support extending between the ears 19 thereof at their upper edges to constitute a stop-shoulder 26. With this shoulder the lever is arranged to abut after it has swung the desired or proper distance beyond dead center. Obviously other means may be provided for thus limiting the forward swinging movement of the hand lever such, for example, as the direct engagement of the free end of the lever with the dash, as would occur in the absence of the shoulder 26. In order further to provide for the desired extent of movement of the head 25 beyond dead center, the hand lever may be shaped so that the portions thereof above and below the head 25 are disposed at a slight angle with reference to each other.

It will be seen that I have produced a controlling device for muffler cut-outs which is of a very simple and highly practical character. The device is capable of operation with extreme facility, being adapted to lock or hold the cut-out valve in open position automatically in that after the operation of opening the cut-out valve has been accomplished manually, the hand lever is caused to assume its holding position by the action of the controlling spring for the valve. Moreover, the device presents a neat and attractive appearance and is capable of being quickly and easily applied to the dash or other part of the vehicle readily accessible to the driver.

While I have herein illustrated and described the invention with considerable particularity, it will be understood that the invention is not to be limited in the interpretation of the appended claims to the precise construction and arrangement set forth except as may be necessitated by the state of the prior art.

I claim as my invention:

1. A controlling device of the character described comprising a lever, a supporting bracket for the lever adapted to be rigidly secured in position in a motor vehicle within convenient reach of the operator, said bracket having an upstanding lug to which the lever is pivoted, a stud projecting laterally from said lever intermediate its ends and adapted to have a cable secured thereto with the cable leading to a part to be actuated, the stud being swingable in the operation of the lever from a suspended position below the pivotal axis of the lever to a raised position over and a short distance beyond dead center, the cable being free to swing in the movements of the lever unrestricted by the bracket.

2. A controlling device for muffler cut-outs comprising a lever, means pivotally supporting one end of said lever, the opposite end of the lever having a finger piece, and a grooved head mounted at one side of the lever so as to be swingable from a suspended position upwardly over center but at one side of the pivotal support, whereby a cable attached to said head and leading to the cut-out may move across the pivotal axis of the lever in such swinging movement thereof.

3. A controlling device for muffler cut-outs comprising a lever, a supporting bracket for the lever adapted to be rigidly secured in position in the vehicle within convenient reach of the operator, said bracket having an upstanding lug to which the lever is pivoted, a stud projecting laterally from said lever intermediate its ends and having at its free end a grooved head located at one side of the bracket and adapted to have a cable secured thereto with the cable engaging in the groove and leading to the cut-out, the head being swingable in the operation of the lever from a suspended position directly below the pivotal axis of the lever to a raised position over and a short distance beyond dead center, the cable being free to swing in the movements of the lever unrestricted by the bracket.

In testimony whereof, I have hereunto set my hand.

JOSEPH HADKA.